United States Patent [19]
Tsuru et al.

[11] Patent Number: 5,485,240
[45] Date of Patent: Jan. 16, 1996

[54] FOCUSING CONTROLLER

[75] Inventors: Hiroyuki Tsuru, Tokyo; Shigemasa Sato, Chiba; Hiroshi Terunuma, Ichikawa, all of Japan

[73] Assignee: Nikon Corporation, Tokyo, Japan

[21] Appl. No.: 283,173

[22] Filed: Aug. 3, 1994

Related U.S. Application Data

[63] Continuation of Ser. No. 116,732, Sep. 7, 1993, abandoned, which is a continuation of Ser. No. 778,445, Oct. 17, 1991, abandoned.

[30] Foreign Application Priority Data

Oct. 26, 1990 [JP] Japan ................... 2-287137

[51] Int. Cl.$^6$ .................................. G03B 13/36
[52] U.S. Cl. ............... 354/402; 354/403; 356/3.1
[58] Field of Search .................. 354/400, 402–408; 356/1

[56] References Cited

U.S. PATENT DOCUMENTS

| | | | |
|---|---|---|---|
| 4,841,325 | 6/1989 | Hoshino | 354/402 |
| 4,938,588 | 7/1990 | Taniguchi | 356/1 |
| 5,005,970 | 4/1991 | Kunishige | 356/1 |
| 5,136,148 | 8/1992 | Nonaka | 354/403 |
| 5,138,356 | 8/1992 | Nakamura et al. | 354/402 |

*Primary Examiner*—Russell E. Adams
*Attorney, Agent, or Firm*—Shapiro and Shapiro

[57] ABSTRACT

A focusing controller for photographic apparatuses includes: a distance meter which detects film-to-object distance to calculate and emit a distance signal; a lens shifting distance calculating device which calculates a lens shifting distance for effecting focusing in a focusing optical system on the basis of the distance signal by using one or two or more linear expressions; and a driving device for driving the focusing optical system in accordance with the lens shifting distance; the focusing controller allowing both the lens shifting amount for the focusing optical system and the reciprocal of film-to-object distance to be set at equal intervals.

9 Claims, 8 Drawing Sheets

FOCUSING CONTROLLER

This is a continuation of application Ser. No. 08/116,732 filed Sep. 7, 1993 (now abandoned), which is a continuation of application Ser. No. 07/778,445 filed Oct. 17, 1991 (abandoned).

BACKGROUND OF THE INVENTION

1. Field of the Invention

This invention relates to a focusing controller for photographic apparatuses and, more specifically, to a focusing controller for photographic apparatuses which effects focusing by shifting a lens by a lens shifting amount converted from a distance signal calculated by and emitted from a distance meter.

2. Related Background Art

In controllers of this type, the conversion to a lens shifting distance of the distance signal, calculated by and emitted from the distance meter, has conventionally been controlled on the basis of the following principle:

First, the relationship between film-to-object distance and lens shifting distance for focusing will be explained with reference to FIG. 1, which is a diagram illustrating the relationship in terms of distance between an object, a film, and lens focuses.

In FIG. 1, the reference symbol x' indicates the distance between the film and the lens focus on the film side. The reference symbol f' indicates the distance between the lens and the lens focus on the film side. The reference symbol f indicates the distance between the lens and the lens focus on the object side. The reference symbol x indicates the distance between the lens focus on the object side and the object, and the reference symbol R indicates the distance between the film and the object.

From the image formation formula, the relationship between the above distances can be expressed as:

$$f=f'$$

$$x \cdot x' = f \cdot f'$$

And, the distance between the object and the film is expressed as:

$$R = f + f' + x + x'$$

Thus, by shifting the lens towards or away from the film surface, the above distance x' is changed, thereby effecting focusing (This operation will be hereinafter referred to simply as "shifting").

Next, a distance signal which is emitted from an active-type distance meter will be explained with reference to FIG. 2, which is a diagram illustrating the principle on the basis of which a light reception position detecting element performs detection with respect to film-to-object distance.

In FIG. 2, the reference symbol P1 indicates the position of a light projecting element.

The light projecting element projects modulated light onto an object. The reference symbol P2 indicates the position of the object, on the surface of which occurs diffused reflection of the modulated light from the light projecting element. The reference symbol P4 indicates a reference position for distance meter values, where a light projection lens is arranged. L is the distance between this reference position and the object. The light projection lens serves to stop down the modulated light from the light projecting element. The reference symbol P6 indicates the film position. Assuming that the distance between P4 and P6 is $\delta$, the above-mentioned value R can be expressed as:

$$R = L + \delta$$

The reference symbol P5 indicates a lens which causes the projection light, reflected by the object, to strike upon a photoreceptor.

The reference symbol P3 indicates a light-reception-position detecting element, which detects changes in a value b due to changes in the above L to calculate the value of 1/L and, further, emit the value of 1/R. Here, b is the value of a distance signal indicating the distance between the light-reception position and the reference position.

The relationship between b and L can be expressed as:

$$L: x0 = y0: b$$

Accordingly;

$$b = x0 \cdot y0/L$$

Thus, the value of b is in proportion to 1/L.

Further, as an electrical signal, there is emitted a distance, signal a, which is an electrical signal corresponding to the position indicated by the value b. If the light-reception-position detecting element consists of a PSD (a semiconductor device), the distance signal a can be calculated from two signals I1 and I2 emitted from the PSD, by using the following equation:

$$a = \frac{I1 - I2}{I1 + I2}$$

Next, the relationship between film-to-object distance and lens shifting distance will be described with reference to FIG. 3, which is a graph illustrating a conventional method of controlling lens shifting distance. In the example shown in this graph, the relationship between lens shifting distance x' and a value 1/R is such that when the focal length is 35 mm, which is a focal length value generally adopted in cameras, 1/R can be expressed as a value which varies at equal intervals. Here, R indicates film-to-object distance and 1/R is the reciprocal thereof. The horizontal axis of the graph represents lens shifting distance and the vertical axis thereof represents the reciprocal of film-to-object distance, 1/R. Shown in the parentheses beside the vertical axis are values of R given in the unit of 0.1 m. As stated above, the distance signal a and the reciprocal of film-to-object distance, 1/R, are in one-to-one correspondence with each other and can be represented in the same axis.

As stated above, in the conventional control method, the reciprocal of film-to-object distance, 1/R, is a value which varies at equal intervals, with the result that the relationship between lens shifting distance and the reciprocal of film-to-object distance, 1/R, is such as to deviate from a linear expression, with the lens shifting distance x' being controlled as a value varying at unequal intervals.

Thus, in the prior art, focusing control has been effected by controlling lens shifting amount at unequal intervals, as stated above. Accordingly, the conventional focusing controller involves a considerable burden in terms of lens shifting control and the mechanism thereof, making the control operation and device structure rather complicated. Therefore, the conversion of distance signal to lens shifting distance and the correction and adjustment of the same have been by no means easy to perform, which has been one of the causes of high production costs. This is due to the fact that the correction and adjustment of lens shifting distance have been effected by adjusting different components of mechanism sections such as the optical system and the cam barrel, which require a well-balanced mutual setting.

SUMMARY OF THE INVENTION

It is an object of this invention to provide a focusing controller which makes it possible to set lens shifting distance with ease, which can effect precise focusing over a relatively wide range, and which allows adjustment to be effected with ease.

In accordance with this invention, there is provided a focusing controller of the type which converts a distance signal calculated by and emitted from a distance meter (B2) into a lens shifting amount, by which a lens is driven and shifted to effect focusing, wherein when the relationship between the distance signal and the lens shifting distance is approximately given in one or two or more linear expressions, the lens shifting distance is set at equal intervals and corrected by varying the coefficients and constants of the linear expressions.

Further, this invention provides a focusing controller wherein the coefficients and constants of the linear expressions are stored in an $E^2PROM$ (B4).

In accordance with this invention, the relationship between the reciprocal of film-to-object distance, 1/R, and lens shifting distance x', is approximately given in linear expressions. That is, the reciprocal of film-to-object distance is in proportion to a distance signal a emitted from the distance meter, with the relationship between the distance signal a and the lens shifting distance x' being approximately given in linear expressions. For a large depth of field, the relationship is given in a single linear expression, and, for a small depth of field, it is given in a plurality of linear expressions.

By means of an external adjusting device which is externally connected to the photographic apparatus, an adjusting operation is carried out.

The conversion of distance signal to lens shifting distance is effected on the basis of the coefficients and constants of linear expressions, which are obtained for each individual photographic apparatus by successively modifying and setting lens shifting distances at equal intervals.

An $E^2PROM$ stores the coefficients and constants of such linear expressions.

DETAILED DESCRIPTION OF THE PREFERRED EMBODIMENTS

The first embodiment of this invention will be described with reference to FIG. 4, which is a block diagram showing the construction of this invention.

In the first embodiment, the relationship between the reciprocal of film-to-object distance, 1/R, and lens shifting distance x', is approximately represented by a single straight line.

Figure 1:
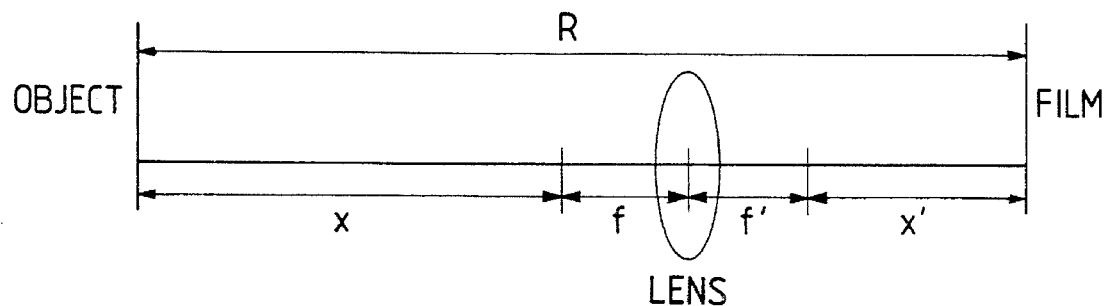
FIG. 1 is a diagram illustrating the relationship in terms of distance between a lens, an object and a film.
Figure 2:
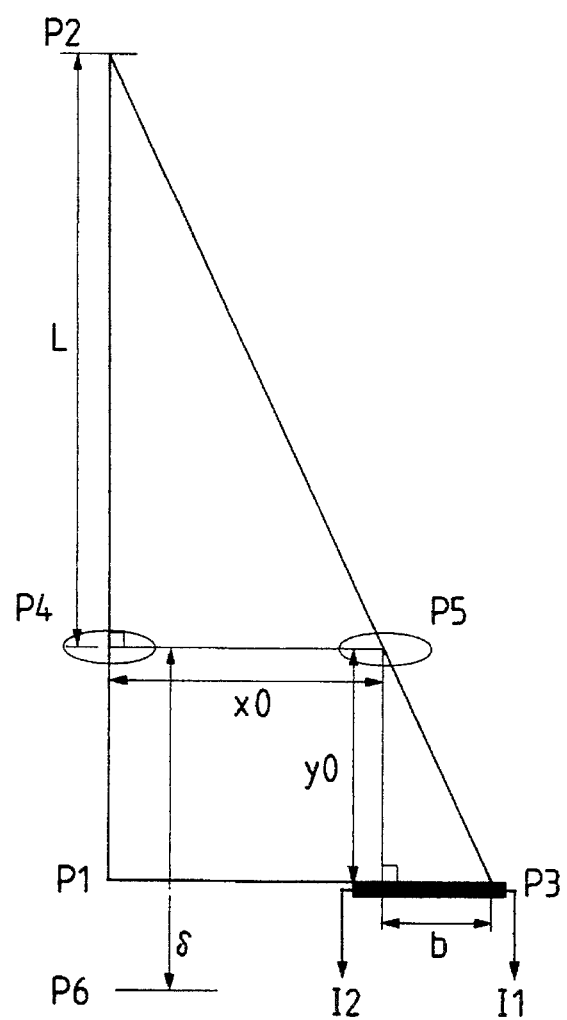
FIG. 2 is a diagram illustrating the principle on the basis of which a position detecting element performs detection with respect to film-to-object distance.
Figure 3:
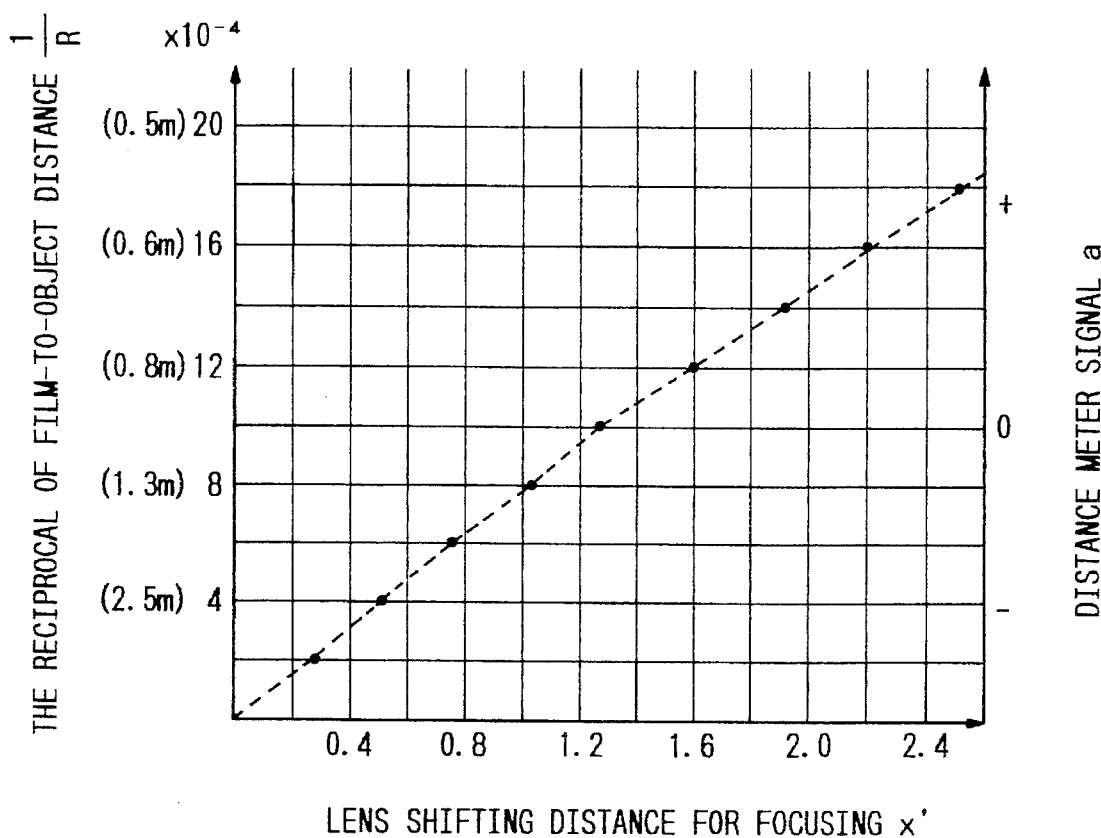
FIG. 3 is a graph illustrating a conventional method of controlling lens shifting distance.
Figure 4:
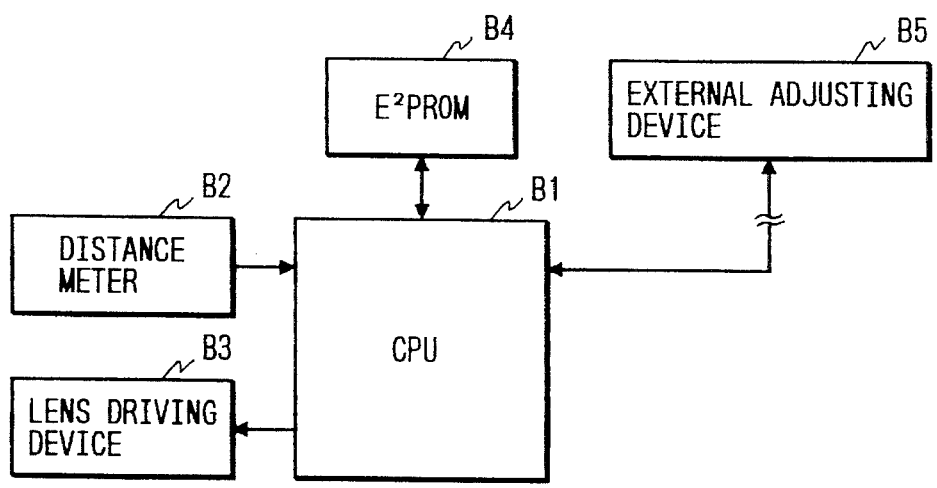
FIG. 4 is a block diagram showing the construction of a device in accordance with this invention.

In FIG. 4, the focusing controller of this embodiment includes: a CPU B1 for controlling each block of the focusing controller; a distance meter B2, which performs distance metering under the control of the CPU B1, supplying the metering results to the CPU B1; a lens driving device B3, which drives the lens to effect focusing under the control of the CPU B1; an $E^2PROM$ B4, which stores a shift value "Sf1" and a gamma value "r" that will be explained below; and an external adjusting device B5, which is not arranged inside the focusing controller of this invention but is connected thereto whenever it requires adjustment.

Next, the operation of this focusing controller will be described with reference to the flowchart of FIG. 5, which illustrates the control method for the first embodiment.

Figure 5:
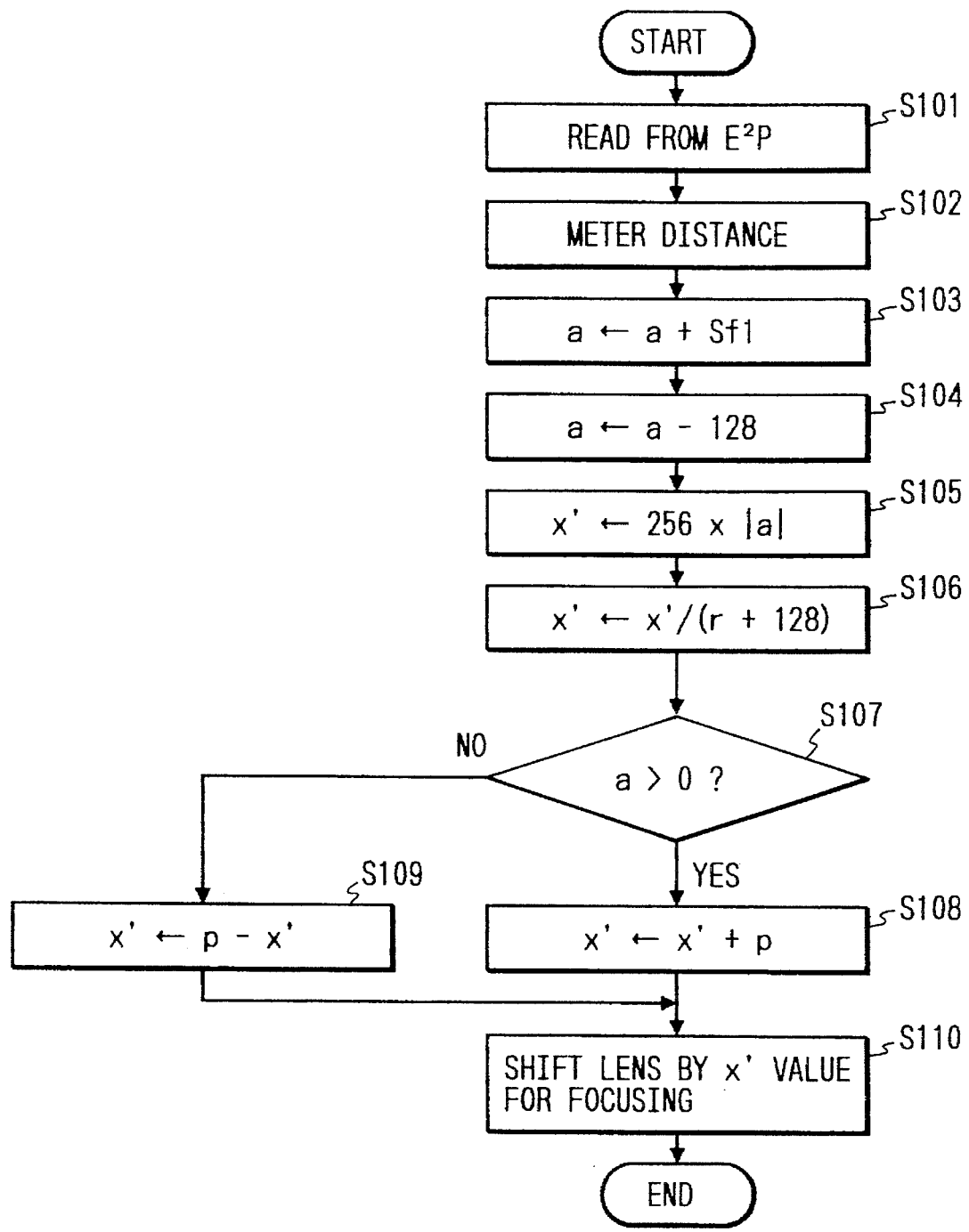
FIG. 5 is a flowchart illustrating a control method in accordance with a first embodiment of this invention.

First, the procedure moves from "START" of FIG. 5 to step S101, where the shift value data of the $E^2PROM$ (B4) is substituted for the variable Sf1, and the gamma value data is substituted for the variable r. Next, in step S102, the distance meter executes distance metering, substituting the result for a variable a. Then, in step S103, the value of the variable Sf1 is added to the value of the variable a, substituting the result for the variable a. Subsequently, in step S104, a numerical value of 128 is subtracted from the value of the variable a, substituting the result for the variable a.

Figure 6:
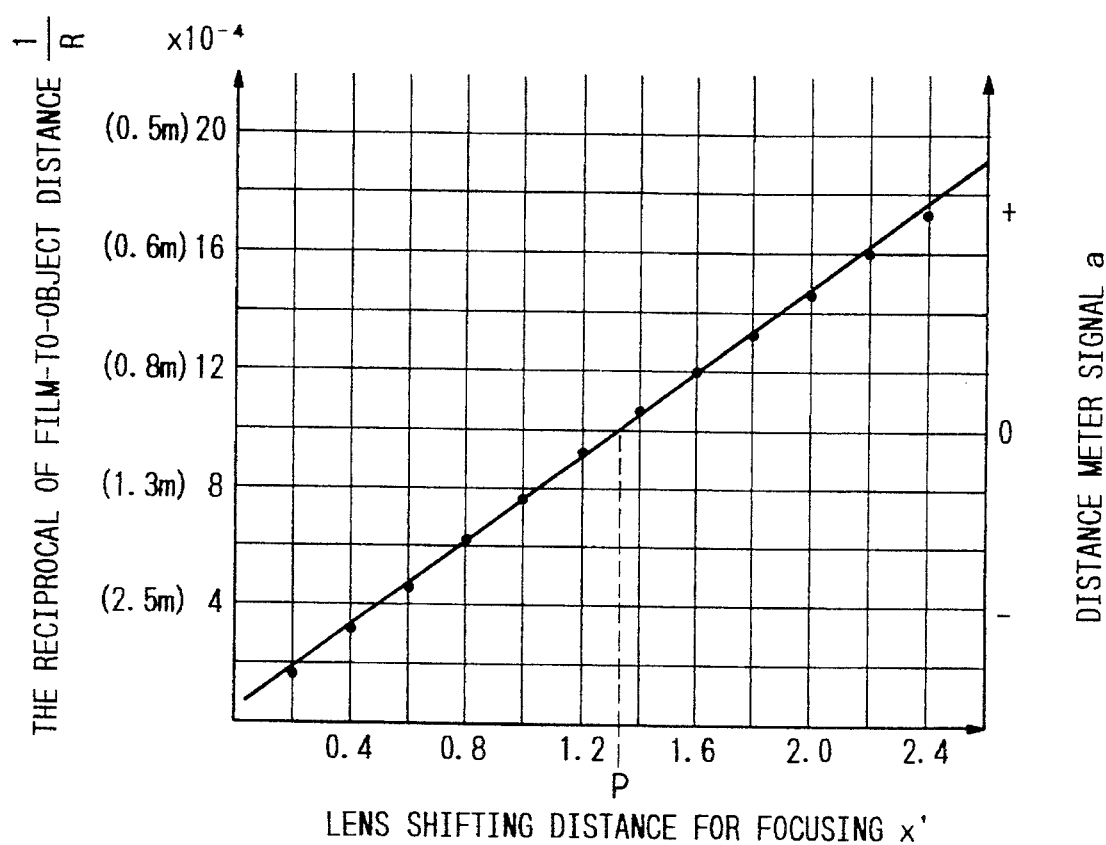
FIG. 6 is a graph of the first embodiment, in which the relationship between film-to-object distance and lens shifting distance is approximately represented by a single straight line.

Here, the variable Sf1 is a value for effecting correction such that, in FIG. 6, the lens shifting distance x' when the distance signal a is 0 is p. FIG. 6 is a graph illustrating the first embodiment, where the relationship between film-to-object distance and lens shifting distance is approximately represented by a single straight line. As is apparent from this graph, the lens shifting distance x' is controlled at equal intervals.

In this embodiment, the variable Sf1 is one of 8-bit precision, and the numerical value to be substituted for it ranges from 0 to 255. Therefore, by subtracting the value 128 from the variable a in step S104, it is possible to effect shifting also in the minus direction. It should be noted that the value 128, used in the above step S104, is only given as an example, and it may be replaced by some other value whenever the shift range requires changing.

Next, in step S105, the absolute value of the variable a is multiplied by 256 and substituted for the variable x'. Then, in step S106, the variable x' is divided by a value obtained by adding 128 to the variable r, substituting the result for the variable x'. Here, in the procedures of steps S105 and S106, correction is effected on the inclination of a straight line, i.e., the coefficient of a linear expression.

The above processing will be explained by using specific numerical values. First, if the value of the variable r is 0, the above calculation will be as follows:

$$x'=x'\times256/128$$

Thus, as a result of the above correction, the value 1 of the variable x' is doubled. If the value of the variable r is 255, the above calculation will be:

$$x'=x'\times256/383$$

Thus, the above correction results in the value of x' being multiplied by approx. 1/(1.5). That is, by storing the value of the variable r in the E²PROM B4, the inclination of each controller can be changed from two fold to 1/(1.5)-fold.

Next, in step S107, a judgment is made as to whether the value of the variable a is larger than 0 or not. If it is larger than 0, the procedure moves on to step S108. If not, the procedure branches off to step S109. In step S108, the value of the variable x' and that of p is added together, and the result is substituted for the variable x', the procedure moving on to step S110. In step S109, on the other hand, the value of the variable x' is subtracted from that of p, and the result is substituted for the variable x', the procedure moving on to step S110. Here, the above value p corresponds to the lens shifting distance when the variable a is 0. Subsequently, in step S110, the lens driving device B3 is controlled to shift the lens by the value of the above variable x', the control operation being terminated at END.

Figure 7:
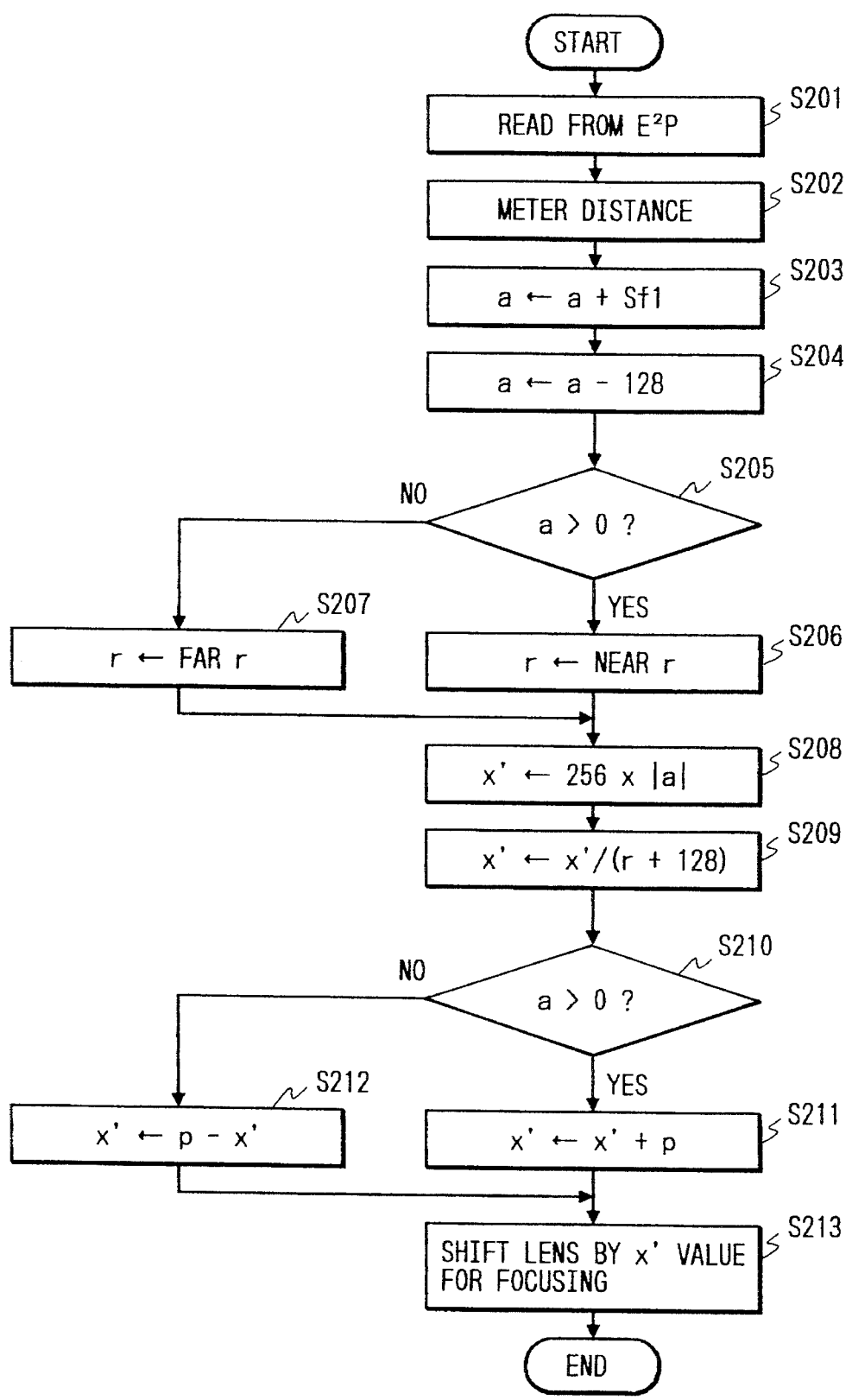
FIG. 7 is a flowchart illustrating a control method in accordance with a second embodiment of this invention.
Figure 8:
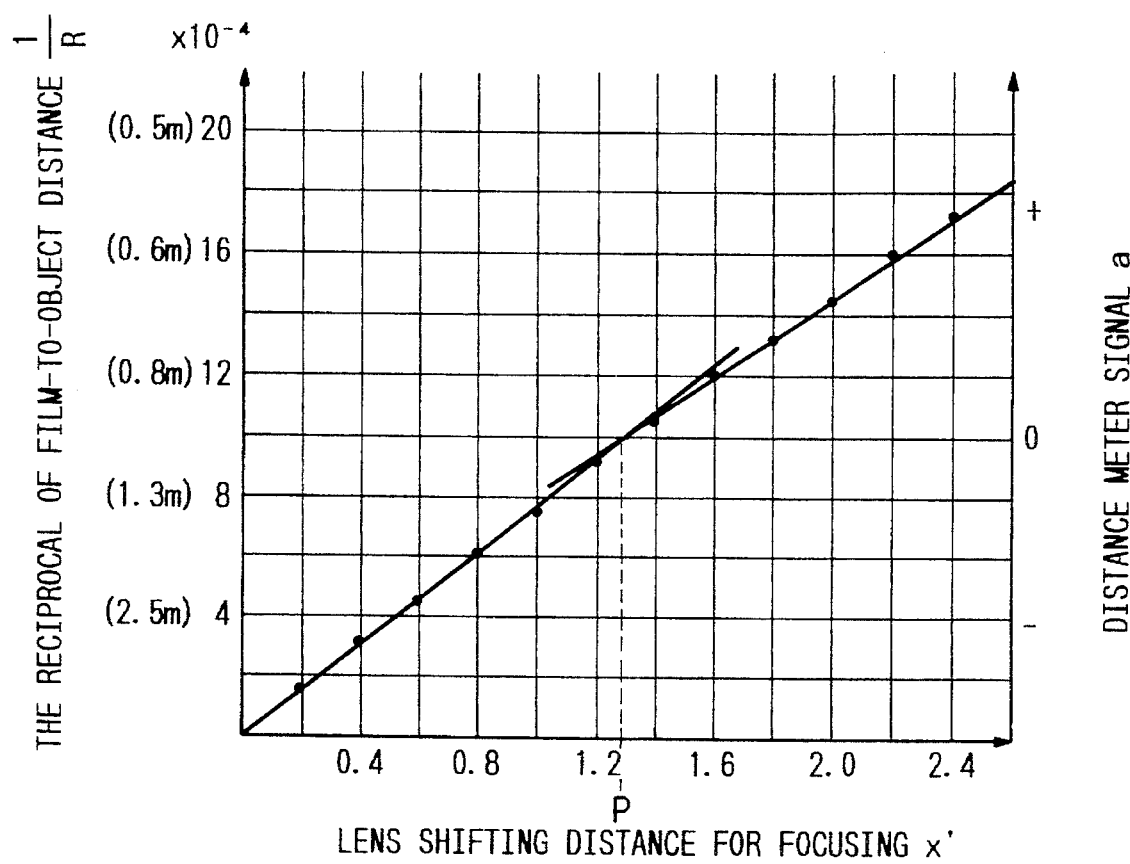
FIG. 8 is a graph of the second embodiment, in which the relationship between film-to-object distance and lens shifting distance is approximately represented by two straight lines.

The relationship between the distance signal a and the lens shifting distance x' in the graph of FIG. 6, described above, may be expressed as follows by using p, Sf1 and r:

$$x' = (a + SIF) \times \Gamma + p$$
where $SIF = Sf1 - 128$
$(Sf1 = 0 \sim 255)$
Further,
$\Gamma = 256/(r + 128)$
$(r = 0 \sim 255)$ Next, the second embodiment of this invention will be described with reference to FIGS. 7 and 8. FIG. 7 is a flowchart illustrating the control method of the second embodiment; and FIG. 8 is a graph in which the relationship between film-to-object distance and lens shifting distance is approximately represented by two straight lines. As is apparent from the graph, the lens shifting distance x' is controlled at fixed intervals.

In the second embodiment, the relationship between the reciprocal of the film-to-object distance, 1/R, and lens shifting distance x', is approximately represented by two straight lines.

As compared with the lens of a 35 mm single focus camera, which entails a large depth of field, a lens having large focal length or the telephoto-side portion of multi-focus lenses exhibits a relatively small depth of field, so that it requires exact lens shifting. For this reason, such lenses require approximation with two straight lines.

The control method of the second embodiment will be described with reference to the flowchart of FIG. 7. First, the procedure moves from "START" to step S201, of FIG. 7, where the shift value data of E²PROM B4 is substituted for the variable Sf1, near-gamma value data is substituted for a variable "near r", and far-gamma value data is substituted for a variable "far r". Next, in step S202, the distance meter B2 executes distance metering, substituting the result for the variable a. Then, in step S203, the value of the variable Sf1 is added to the value of the variable a, the result being substituted for the variable a. Subsequently, in step S204, the numerical value 128 is subtracted from the value of the variable a, the result being substituted for the variable a. Here, the variable Sf1 is a value for effecting correction such that, in FIG. 8, the lens shifting amount x' is p when the distance signal is 0. It is also possible, in this embodiment, for the numerical value to be replaced by some other value. Next, in step S205, a judgment is made as to whether the value of the variable a is larger than 0 or not. If it is larger than 0, the procedure moves on to step S206. If not, the procedure branches off to step S207. In step S206, the value of the variable near r is substituted for the variable r, whereas in step S207, the value of the variable far r is substituted for the variable r. Here, the position where the variable a, which constitutes the distance meter data, is 0, is the intersection of the two straight lines of FIG. 8, i.e. the point at which x'=p. Next, in step S208, the absolute value of the variable a is multiplied by 256 and substituted for the variable x'. Subsequently, in step S209, the variable x' is divided by a value obtained by adding 128 to the variable r, the result being substituted for the variable x'. Here, in the procedures of steps S208 and S209, correction is effected on the inclination of the straight lines, as in the first embodiment. Next, in step S210, a judgment is made as to whether the value of the variable a is larger than 0 or not. If it is larger than 0, the procedure moves on to step S211. If not, the procedure branches off to step S212. In step S211, the value of the variable x' and that of p are added together, whereas, in step S212, the value of the variable x' is subtracted from p, and the result is substituted for the variable x', the procedure moving on to step S213. Here, the value of p mentioned above means the lens shifting distance when the variable a is 0. Then, in step S213, the lens driving device B3 is controlled to shift the lens through a distance corresponding to the value of the above variable x', the control operation being terminated with END.

The relationship between the distance signal a and the lens shifting distance x' in the graph of FIG. 8, described above, may be expressed as follows by using p, Sf1, near r, and far r:

$$x' = (a + SIF) \times \Gamma + p$$
where $SIF = Sf1 - 128$
$(Sf1 = 0 \sim 255)$
Further, when $a > 0$,
$\Gamma = 256/(near\ r + 128)$
where near $r = 0 \sim 255$
And, when $a \leq 0$,
$\Gamma = 256/(far\ r + 128)$
where far $r = 0 \sim 255$ Next, adjusting operations to be executed by the CPU B1, E²PROM B4, and the external adjusting device B5 will be described with reference to FIGS. 9 and 10. The method of adjustment is common to the first and second embodiments.

Figure 9:
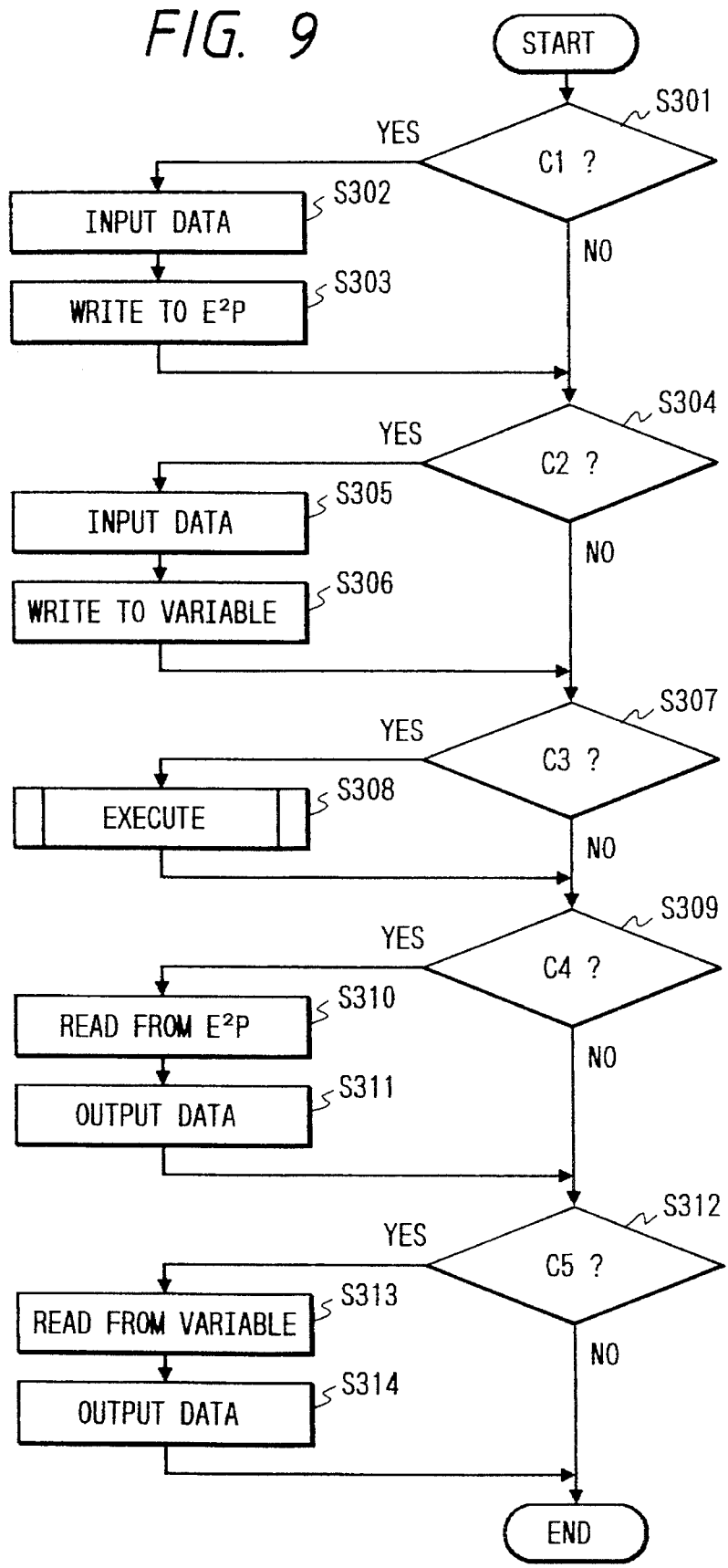
FIG. 9 is a flowchart illustrating an adjusting operation to be executed by a CPU.
Figure 10:
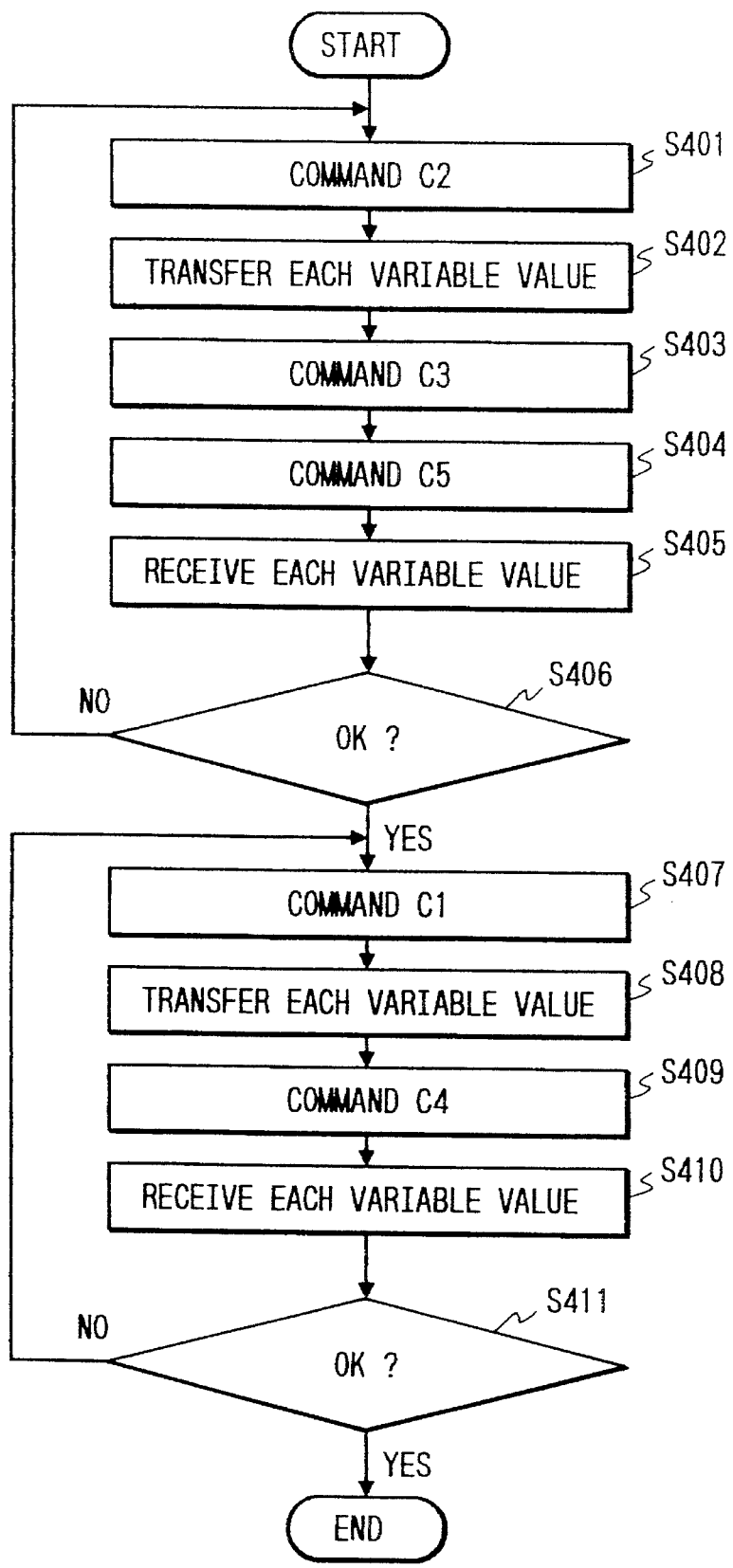
FIG. 10 is a flowchart illustrating an adjusting operation to be executed by an external adjusting device.

FIG. 9 is a flowchart illustrating the adjustment operation executed by the CPU B1, and FIG. 10 is a flowchart illustrating the adjustment operation executed by the external adjusting device B5.

FIG. 9 is a flowchart showing the embodiment of the processing when the CPU B1 has received instructions from the external adjusting device B5. First, one of commands C1 to C5 are transmitted from the external adjusting device B5 to the CPU B1, which executes the processing of FIG. 9, starting with "START". Then, in step S301, a judgment is made as to whether the command transmitted has been C1 or not. If it has not been C1, the procedure moves on to step S304, and, if it has been C1, the procedure branches off to step S302. Then, in step S302, the data to be written to the E²PROM B4 is inputted through the external adjusting device B5. Here, the data to be written consists of the address of the E²PROM B4 and the numerical value to be written thereto. Next, in step S303, the above data is written to the E²PROM B4, and the procedure moves on to step S304. Then, in step S304, a judgment is made as to whether the command transmitted has been C2 or not. If it is not C2, the procedure moves on to step S307; if it has been C2, the procedure branches off to step S305. Next, in step S305, the data to be written to the variable is inputted through the external adjusting device B5. Then, in step S306, the data is written to the variable. In this way, the lens shifting distance is converted from the distance signal in accordance with the coefficients and constants of the linear expressions obtained and measured for each individual photographic apparatus. The correction of this lens shifting distance can be easily and quickly effected by inputting the coefficients and constants of the linear expressions through the external adjusting device B5. Whereas in the prior art the correction of lens shifting amount has been effected with considerable difficulty through adjustment of the different sections of the optical system, mechanism portion, etc., the adjusting operation in this embodiment can be carried out with ease since lens shifting amount is controlled there at fixed intervals by means of the external adjusting device B5. This embodiment is highly advantageous in that the correction of lens shifting amount can be effected solely by data input through the external adjusting device B5. Next, in step S307, a judgment is made as to whether the command transmitted has been C3 or not. If it has not been C3, the procedure moves on to step S309; if it has been C3, the procedure branches off to step S308. Then, in step S308, lens drive control is executed. Here, the "lens drive control" means the execution of step S102 to END of FIG. 5, in the case of the first embodiment; in the case of the second embodiment, it means the execution of step S202 to END of FIG. 7. The reason for starting the execution with step S102 of FIG. 5 or step S202 of FIG. 7 will be explained later with reference to FIG. 10. Next, in step S309, a judgment is made as to whether the command transmitted has been C4 or not. If it has not been C4, the procedure moves on to step S312; if it has been C4, the procedure branches off to step S310. Then, in step S310, data is read out from the E²PROM B4. Subsequently, in step S311, the data read out in step S310 is supplied to the external adjusting device B5. Then, in step S312, a judgment is made as to whether the command transmitted has been C5 or not. If it has not been C5, the procedure moves on to END to terminate the processing; if it has been C5, the procedure branches off to step S313. Then, in step S313, the variable value is read out. Next, in step S314, the data is supplied to the external adjusting device B5. Then, the procedure moves on to END to terminate the processing.

Next, the command transmission from the external adjusting device B5 to the CPU B1 will be described with reference to the flowchart of FIG. 10. First, when the external adjusting device B5 adjusts the present lens driving device, the processing of FIG. 10 is executed starting from START.

From START of FIG. 10, the procedure moves on to step S401, where command C2 is transmitted to the CPU B1. Upon receiving this command, the CPU B1 starts data input processing in step S305. Then, in step S402, the variable values are transferred from the external adjusting device B5 to the CPU B1. That is, the variable values in the CPU B1 are set by the external adjusting device B5. Next, in step S403, command C3 is transmitted. Upon receiving this command, the CPU B1 executes lens driving in step S308. That is, the procedures from step S102 to END of FIG. 5 or those from step S202 to END of FIG. 7 are executed. Here, the reason for starting the processing with step S102 is that starting the execution with step S101 would result in the data set in the steps S401 and S402 being changed to the data of the E²PROM B4. Further, it might be possible to update the data of the E²PROM B4 each time. That, however, is not very desirable since, with the existing E²PROM B4, there is a limitation to the number of times of writing.

The reason for starting the execution with step S202 of FIG. 7 is the same as that stated above.

Next, in step S404, command C5 is transmitted to the CPU B1. Upon receiving this command, the CPU B1 reads out the variable value in step S313, emitting the data in step S314. The data is received in step S405, by the external adjusting device B5. Then, in step S406, a judgment is made as to whether the above data is in conformity with the standard or not; if it is not in conformity with the standard, the procedure returns to step S401, and the processes of steps S401 to S406 are executed again. If, in step S406, the variable values are in conformity with the standard, the procedure moves on to step S407. Then, in step S407, command C1 is transmitted to the CPU B1. Upon receiving this command, the CPU B1 goes on to perform the procedure of step S302. Next, in step S408, the values of the variables are transferred to the CPU B1. The data is inputted, in step S302, by the CPU B1, and, in step S303, written to the E²PROM B4. Subsequently, in step S409, command C4 is transmitted to the CPU B1. Upon receiving this command, the CPU B1 reads out the data of the E²PROM B4 in step S310, and, in step S311, supplies the data to the external adjusting device B5. Then, in step S410, the above output data is received. Next, in step S411, a judgment is made as to whether the data transferred in step S408 and the data received in step S410 are the same or not; if they are not the same, the procedure returns to step S407, and a similar processing is executed again. If, in step S407, these two categories of data are found to be the same, the procedure moves on to END, thus terminating the adjusting process.

In accordance with this invention, the relationship between the reciprocal of film-to-object distance, 1/R, and lens shifting distance x' is approximately given in linear expressions. That is, the reciprocal of film-to-object distance is in proportion to a distance signal a emitted from a distance meter, and the relationship between the distance signal a and the lens shifting distance x' is approximately represented by linear expressions. In the case of a small-focal-range camera, with which the depth of field is relatively large, the relationship is given in a single linear expression, whereas, in the case of a large-focal-range camera, with which the depth of field is relatively small, the relationship is given in a plurality of linear expressions, whereby it is possible to perform the setting of lens shifting distance without involving any deterioration in precision. Further, since both the lens shifting distance x' and the reciprocal of film-to-object distance, 1/R, can be set at equal intervals, the lens driving device can be designed with ease.

Further, when the depth of field is small and a sufficient level of precision cannot be attained with a single linear expression, a plurality of linear expressions may be used, thereby making it possible to effect focusing with a relatively high level of precision over a wide range of film-to-object distance.

The adjusting operation can be performed with ease by an external adjusting device which is externally connected to the photographic apparatus, so that an improvement is attained in terms of production manpower, which leads to reduction in production costs.

As stated above, the conversion of distance signal to lens shifting distance is effected on the basis of the coefficients and constants of linear expression obtained and prescribed for each individual photographic apparatus by successively changing and setting lens shifting distances at equal intervals, so that the focusing controller can be adjusted even if the position detecting element in the distance meter is offset to the right or to the left.

Further, since the coefficients and constants of the linear expression(s) are stored in the $E^2$PROM B4, correction can be effected with ease for any error due to the differences between individual focusing controllers differing from each other in terms of combination of distance meter and lens driving device.

What is claimed is:

1. A focusing controller comprising:
   a distance meter which detects film-to-object distance to calculate and emit a distance signal;
   a lens shifting distance calculating means which calculates a lens shifting distance for effecting focusing in a focusing optical system from said distance signal by using one or more linear expressions approximately relating the distance signal and the lens shifting distance;
   means cooperable with an external adjusting device to enable changing of coefficients and constants of said one or more linear expressions to adjust said lens shifting distance; and
   a driving means for driving said focusing optical system in accordance with said lens shifting distance;
   whereby both the lens shifting distance for said focusing optical system and the reciprocal of film-to-object distance can be set at equal intervals.

2. A focusing controller as claimed in claim 1, further comprising:
   an $E^2$PROM for storing the coefficients and constants of said linear expressions.

3. A focusing controller comprising:
   a distance meter which detects film-to-object distance to calculate and emit a distance signal;
   a lens shifting distance calculating means which calculates a lens shifting distance for effecting focusing in a focusing optical system from said distance signal by using one or more expressions approximately relating the distance signal and the lens shifting distance;
   a driving means for driving said focusing optical system in accordance with said lens shifting distance; and
   adjusting means for adjusting said lens shifting distance by changing coefficients and constants of said expressions;
   whereby both the lens shifting distance for said focusing optical system and the reciprocal of film-to-object distance can be set at equal intervals.

4. A focusing controller as claimed in claim 3, further comprising:
   an $E^2$ PROM for storing the coefficients and constants of said approximate expressions.

5. A focusing controller comprising:
   switching means for switching a focal length;
   a distance meter which detects film-to-object distance to calculate and emit & distance signal;
   calculating means for calculating an amount of movement of a focusing optical system for affecting focusing in the focusing optical system from said distance signal by using one or more expressions approximately relating the distance signal and the amount of movement of the focusing optical system;
   driving means for driving said focusing optical system in accordance with said amount of movement;
   setting means for setting both the amount of driving for said optical system and the reciprocal of the film-to-object distance at equal intervals; and
   changing means for changing coefficients and constants of said expressions every focal length switched by said switching means.

6. A focusing controller as claimed in claim 5, further comprising: storing means for storing the coefficients and constants of said expressions.

7. A focusing controller as claimed in claim 6, wherein said storing means is an $E^2$PROM.

8. A focusing controller for plural focal length areas, comprising:
   a distance meter which detects film-to-object distance to calculate and emit a distance signal;
   calculating means for calculating an amount of movement of a focusing optical system for affecting focusing in the focusing optical system from said distance signal by using one or more expressions approximately relating the distance signal and the amount of movement of the focusing optical system;
   driving means for driving said focusing optical system within the focal length areas in accordance with said amount of movement;
   setting means for setting both the amount of driving for said optical system and the reciprocal of the film-to-object distance at equal intervals; and
   storing means for storing coefficients and constants of said expressions for every focal length area.

9. A focusing controller as claimed in claim 8, wherein said storing means is an $E^2$PROM.

* * * * *